Patented Mar. 2, 1937

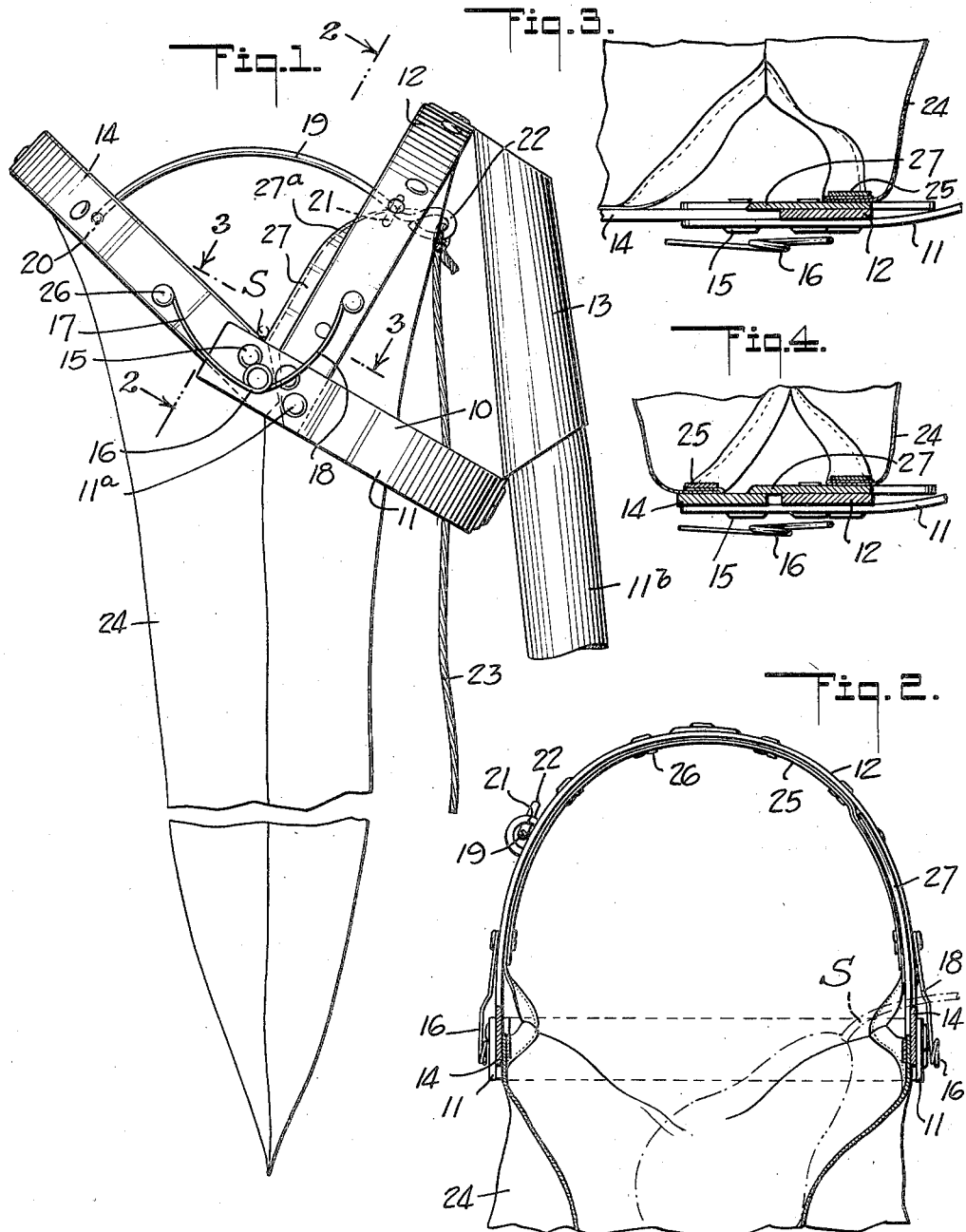

2,072,558

UNITED STATES PATENT OFFICE 2,072,558

FRUIT PICKER

Milo Hunt, Whittier, Calif.

Application February 3, 1936, Serial No. 62,158

2 Claims. (Cl. 56—334)

This invention relates to fruit pickers, and is more particularly directed to the type of picker disclosed in U. S. Letters Patent No. 1,255,596, dated February 5, 1918, and issued to Herman Gielow, which said patent was assigned to me by said Gielow on the 5th day of November, 1926.

While the device herein disclosed is capable of all those certain uses stated in said Letters Patent No. 1,255,596, it is also formed, constructed and designed to better satisfy the need for a device intended primarily for picking avocados and to prevent bruising or wounding of the fruit when severing same from the tree. The avocado is an exceedingly delicate variety of fruit, the pulp of which is marrow-like, and the process of gathering said fruit must be carefully conducted, as otherwise the fruit will be bruised and the market value of the fruit impaired. In the device disclosed in the aforestated patent, and assuming that the device could be used for gathering avocados, it is first required that the fruit be first entirely received within the sack of the device and the two jaws of the device closed fully and firmly against the stem to thereby cut same, and sever the fruit from the tree. Inasmuch as it is required that the jaws of the device be fully closed against each other before the fruit can be severed from the tree, it is found, in practice, that in so doing the fruit is gouged by the jaws and thereby bruised and sometimes seriously wounded.

The improved device herein disclosed and forming my invention has for its main object the provision of shearing means which will act upon the stem considerably in advance of the full closing of the jaws, thus enabling the fruit to be severed from the tree and to fall to the bottom of the soft, short-length bag before the jaws are fully closed, thus preventing the jaws from contacting the fruit.

With the above mentioned and other objects in view, the invention consists in the novel construction and combination of parts hereinafter described, illustrated in the accompanying drawing, and set forth in the hereto appended claims, it being understood that various changes in the form, proportion, size and minor details of the construction within the scope of the claims may be made without departing from the spirit or sacrificing any of the advantages of the invention.

In the drawing,

Figure 1 is a view in side elevation of the device, the jaws being shown opened relative to each other;

Figure 2 is a section taken substantially on the line 2—2 of Figure 1;

Figure 3 is a section taken on line 3—3 of Figure 1;

Figure 4 is a view similar to Figure 3 showing a partially closed position of the jaws as when effecting a true shearing cut of the stem of the fruit.

As no claim is made to such of the details of construction of the device as are old in the device of Gielow, U. S. Letters Patent No. 1,255,596, only such reference thereto will be made as is required to enable a person trained in the art to make the invention.

The numeral 10 designates a framework including a bowed strip of strap iron 11, a second bowed strip of strap iron 12 arranged in a plane at right angles to the plane of that strip 11, and having its ends riveted thereto at 11a, whereby the two strips are firmly secured together. A handle socket 13, preferably constructed of sheet metal, is firmly riveted at its respective ends to the strips 11 and 12 and has inserted therein one end of a long handle 11b.

The bowed strip 12 acts as one of the jaws of the picker and co-acts with a swinging jaw 14 to effect a severing of the stems of the fruit in a manner to be more fully stated as the description proceeds. Said jaw 14 is pivotally connected to the frame member 11 by rivets 15, and is capable of swinging from the normal opened position shown in Figure 1 to a position to cause the stem of the fruit to be severed. Suitable springs 16 have their stretches 17 and 18, respectively, secured to the jaws 12 and 14 to hold them normally open. An arcuate rod 19 is fixed at 20 to the jaw 14 and same is freely passed through a guide eye 21 on the jaw 12. Its free end is formed with an eye 22 to which one end of a pull cord 23 is secured. The cord is intended to extend to the ground and to be disposed within convenient reach of the operator for opening and closing the jaws as and when desired.

The short soft sack 24 is secured at its open end to the inner faces of the jaws 12 and 14 by segmental bands 25 of metal. Split pins 26 are passed through the jaws and through the material of the sack and through the bands 25 and serve to co-act with the latter to removably secure same in sack clamping positions. The construction is such as to firmly hold the sack applied, yet enabling same to be removed when worn and a new sack substituted therefor.

Secured to the inner flat face of the jaw 12 is a short length shearing knife 27, the effective cutting edge of which projects beyond the inner edge of the jaw 12, as shown in Figures 1 and 4. The external face of the knife 27 is adapted to come in flat rubbing contact with the inner flat face of the jaw 14 when the jaws are moved against the normal urging tendency of the springs 16.

It follows from the foregoing that after the device has been correlated with the fruit, the stem of the fruit can be disposed between the cutting edge of the knife 27 and the adjacent edge of the jaw 14, the stem S shown in Figures 1 and 2 being positioned preferably at the very intersection of the angles defined by said cutting edge and said adjacent edge of jaw 14. When so disposed, the whole of the tender fruit will reside within the bag and below the effective path of movement of the two jaws. Thus, the stem can be completely severed and the fruit allowed to freely fall into the sack without contacting the jaws. The benefit flowing from the device will be better appreciated when bearing in mind that one can observe from the ground entry of the stem of the fruit in the crotch between the knife 27 and the jaw 14, but cannot see sufficient of the fruit in all picking conditions to be sure that all of the fruit is in the sack and out of the way of the jaws before closing the latter. The device insures that before the jaws come fully together the stem will have been severed; hence, the fruit will repose safely in the sack before the jaws are closed.

The knife 27 preferably extends from a point at one side of the sack frame, approximately at the pivot 15 to a point in the arc of the strip 14 such as will enable the stem S to be cammed over the curved end 27a of the knife and guided into the bottom of the V-shaped crotch formed by the cutting edge of the knife and the adjacent edge of the bowed strip 12. In this manner, the stem is not only guided to a severing position but is firmly gripped between the edge of the knife and the edge of strip 12 in advance of closing the strips relative to each other. Thus, it follows that the fruit is entirely cut from the tree and will have fallen into the sack much in advance of an appreciable movement of said strips.

What is claimed is:

1. In a fruit picker, the combination with a fruit receiving sack having an open upper end provided with bowed frame members, pivotally connected together to move relative to each other, and means normally influencing the members to hold them in positions for entry therebetween of the fruit, of stem-severing means comprising a bowed knife secured to one of said members and having an effective cutting edge disposed relative to the inner surface of the other member to come in shearing contact with said surface to sever the stem of the fruit and enable the later to fall into the sack during movement of said members toward each other.

2. In a fruit picker, the combination with a fruit receiving sack having an open upper end provided with bowed frame members, pivotally connected together to move relative to each other, and means normally influencing the members to hold them in positions for entry therebetween of the fruit, of stem-severing means comprising a bowed knife secured to one of said members and having an effective cutting edge disposed relative to the inner surface of the other member to come in shearing contact with said surface to sever the stem of the fruit and enable the latter to fall into the sack during movement of said members toward each other, said knife conforming to the curvature of the member to which it is secured and extending from the point of pivotal connection of both members with each other to a point in the arc of the member to which it is secured appreciably beyond said pivot to define with the other member a V-shaped crotch into which the stem of the fruit can be received for severing during initial closing movement of the members from fully open position.

MILO HUNT.